US007046401B2

(12) United States Patent
Dufaux et al.

(10) Patent No.: US 7,046,401 B2
(45) Date of Patent: May 16, 2006

(54) CAMERA-BASED DOCUMENT SCANNING SYSTEM USING MULTIPLE-PASS MOSAICKING

(75) Inventors: Frederic Dufaux, Chestnut Hill, MA (US); Sing Bing Kang, Redmond, WA (US); Robert Alan Ulichney, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 09/872,725

(22) Filed: Jun. 1, 2001

(65) Prior Publication Data

US 2002/0186425 A1 Dec. 12, 2002

(51) Int. Cl.
*H04N 1/387* (2006.01)
*H04N 1/04* (2006.01)
*G06K 9/48* (2006.01)
*G06K 9/40* (2006.01)
*G06K 9/00* (2006.01)

(52) U.S. Cl. .................. 358/450; 358/474; 358/473; 358/478; 382/275; 382/107; 382/241

(58) Field of Classification Search ............. 358/473, 358/478, 450, 284, 241, 474; 382/305, 275, 382/284, 107, 241; 348/241
See application file for complete search history.

(56) References Cited

U.S. PATENT DOCUMENTS 6,075,905 A * 6/2000 Herman et al. ............. 382/284
6,078,701 A * 6/2000 Hsu et al. .................. 382/294
6,173,087 B1 * 1/2001 Kumar et al. ............... 382/284
6,597,816 B1 * 7/2003 Altunbasak et al. ........ 382/275

OTHER PUBLICATIONS

Irani, Michal, Anandan, P. and Hsu, Steve, Mosaic Based Representations of Video Sequences and Their Applications, IEEE, (c)1995, pp. 605-611.
Mann, S. and Picard, R.W., Virtual Bellows: Constructing High Quality Stills from Video, IEEE, (c)1994, pp. 363-367.
Szeliski, Richard and Coughlan, James, Hierarchical Spline-Based Image Registration, IEEE, (c)1994, pp. 194-201.
Sawhney, Harpeet S., Ayer, Serge and Gorkani, Monika, Model-based 2D & 3D Dominant Motion Estimation for Mosaicing and Video Representation, IEEE, (c) 1995, pp. 583-590.
Liebowitz, David and Zisserman, Andrew, Metric Rectification for Perspective Images of Planes, pp. 1-7.

(Continued)

*Primary Examiner*—Edward Coles
*Assistant Examiner*—Houshang Safaipour

(57) ABSTRACT

A camera-based document scanning system produces electronic versions of documents, based on a plurality of images of discrete portions of the documents. The system compares each pair of consecutive images and derives motion parameters that indicate the relative motion between each pair of consecutive images. The system utilizes the derived motion parameters to align and merge each image with respect to the previous images, thereby building a single, mosaic image of the document. In the illustrative embodiment, the motion parameters are derived by minimizing a sum of squared differences equation on a pixel-by-pixel basis.

24 Claims, 11 Drawing Sheets

OTHER PUBLICATIONS

Sing Bing Kang, Semiautomatic Methods for Receovering Radial Distortion Parameters from a Single Image, Digitial Equipment Corporation, May 1997, pp. 1-21.

Szeliski, Richard, Image Mosaicing for Tele-Reality Applications, Digitial Equipment Corporation, May 1994, pp. 1-30.

* cited by examiner

CAMERA-BASED DOCUMENT SCANNING SYSTEM USING MULTIPLE-PASS MOSAICKING

BACKGROUND OF THE INVENTION

1. Field of the Invention

This invention relates generally to imaging systems and, more specifically, to a low cost system for creating scanned images of documents.

2. Background Information

Several devices are currently available for scanning documents. Flat bed scanners, for example, are routinely used to generate a digital, electronic version of a hard copy of a document. Flat bed scanners typically employ a scanning mechanism disposed below a glass plate. A document to be scanned is placed face-down on the glass plate. Light is projected onto the document and the reflected light from the document is focused by a lens onto light-sensitive diodes. The diodes translate the reflected light into electrical currents. An analog-to-digital (A/D) converter converts the electrical currents into digital pixels. The pixels are then processed by a graphics or optical character recognition program to produce an electronic version of the scanned document.

Hand-held scanners are also commercially available for creating digital, electronic versions of documents. Hand-held scanners work in a similar fashion as flat-bed scanners, although the operative area is typically much smaller. In particular, a hand held scanner includes one or more light emitting diodes (LEDs) that illuminate the document. The reflected light from the document is focused by a lens onto a charge coupled device (CCD) which contains a series of light detectors. An A/D converter generates digital pixels from the output of the CCD's light detectors.

Although the prices of flat-bed and hand-held scanners continues to fall, they are still relatively expensive. Flat bed scanners, moreover, can be relatively bulky. Accordingly, they are not considered to be portable equipment. For people who frequently travel, flat bed scanners are not a suitable method of scanning documents. Although hand-held scanners are relatively portable, they typically produce poorer quality images than flat bed scanners. Most hand-held scanners, moreover, are not wide enough to scan common document sizes, such as those on 8½ by 11 inch paper.

Hewlett-Packard Co. of Palo Alto, Calif. recently released a hand-held scanning product called Capshare. Although its scanning area is only four inches wide, according to the product literature, it can "stitch" together sections to form a single image of larger sized documents, e.g., 8½ by 14 inches. The Capshare product, however, is limited to generating bi-tonal images of scanned documents, and is relatively expensive. It is also extremely sensitive to perturbations in device-to-document separation.

Other products for stitching together images also exist. QuickStitch software from Enroute Imaging, for example, stitches individual digital photographs into a single, panoramic image. Other software-based products include Panorama from Picture Works Technology, Inc., now Internet Pictures Corporation. However, neither Quickstitch nor Panorama can reliably generate a composite image of a document containing text.

Accordingly, a need exists for a low-cost system for creating digital, electronic versions of documents containing text.

SUMMARY OF THE INVENTION

Briefly, the present invention is directed to a camera-based document scanning system. The system receives a plurality of images of discrete portions of the document generated by the camera, and produces a digital, electronic image of the entire document by assembling or "mosaicking" those images together. In accordance with the illustrative embodiment, the system includes an image correction engine, one or more motion estimation engines and one or more image alignment and blending engines. Coupled to the image correction engine are one or more look-up tables preconfigured with correction data for the particular video camera being utilized. The image correction, motion estimation and alignment and blending engines are preferably implemented as software routines or programs executable by a computer, such as a personal computer, having a display or monitor. The look-up tables, preferably reside on the computer's memory.

In operation, the video camera is coupled to the personal computer so that digital image frames captured by the camera can be transmitted to and received by the computer. The document of interest may be placed on a generally flat surface, such as a desktop. The user then activates the video camera and takes multiple, video image sweeps of the document. For example, the video camera may be placed on a stand, and the user, by grasping and moving the stand, may sweep the video camera across the document several times such that each section of the document is captured on the image frames generated by the camera. The image correction engine converts the "raw" image frames from the video camera into "corrected" image frames based on the contents of the look up tables. The corrected image frames from each sweep are fed into the motion estimation engine which derives the relative motion between consecutive image frames. Using the derived motion information, the alignment and blending engine merges each image into a mosaic formed from the previous images for each sweep. Each sweep image is then returned to the motion estimation engine and the relative motion between consecutive sweep images is derived. The alignment and blending engine then merges each sweep image into a final, composite image of the entire document, using the relative motion information derived for the sweeps. The final, composite images may then be displayed and/or stored at the computer for subsequent processing.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
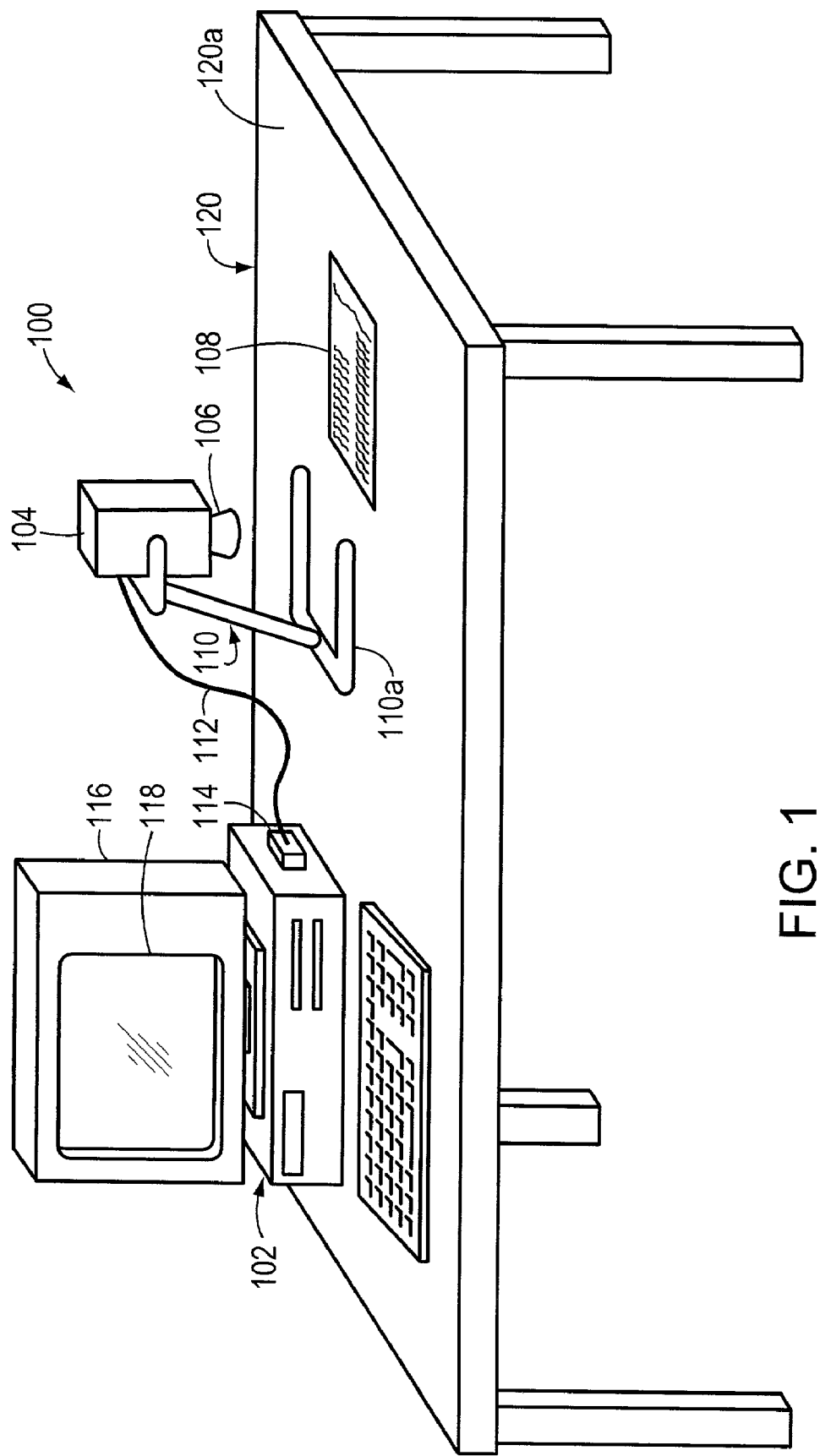
FIG. 1 is a highly schematic illustration of a preferred computer-based environment employing the present invention.
Figure 2:
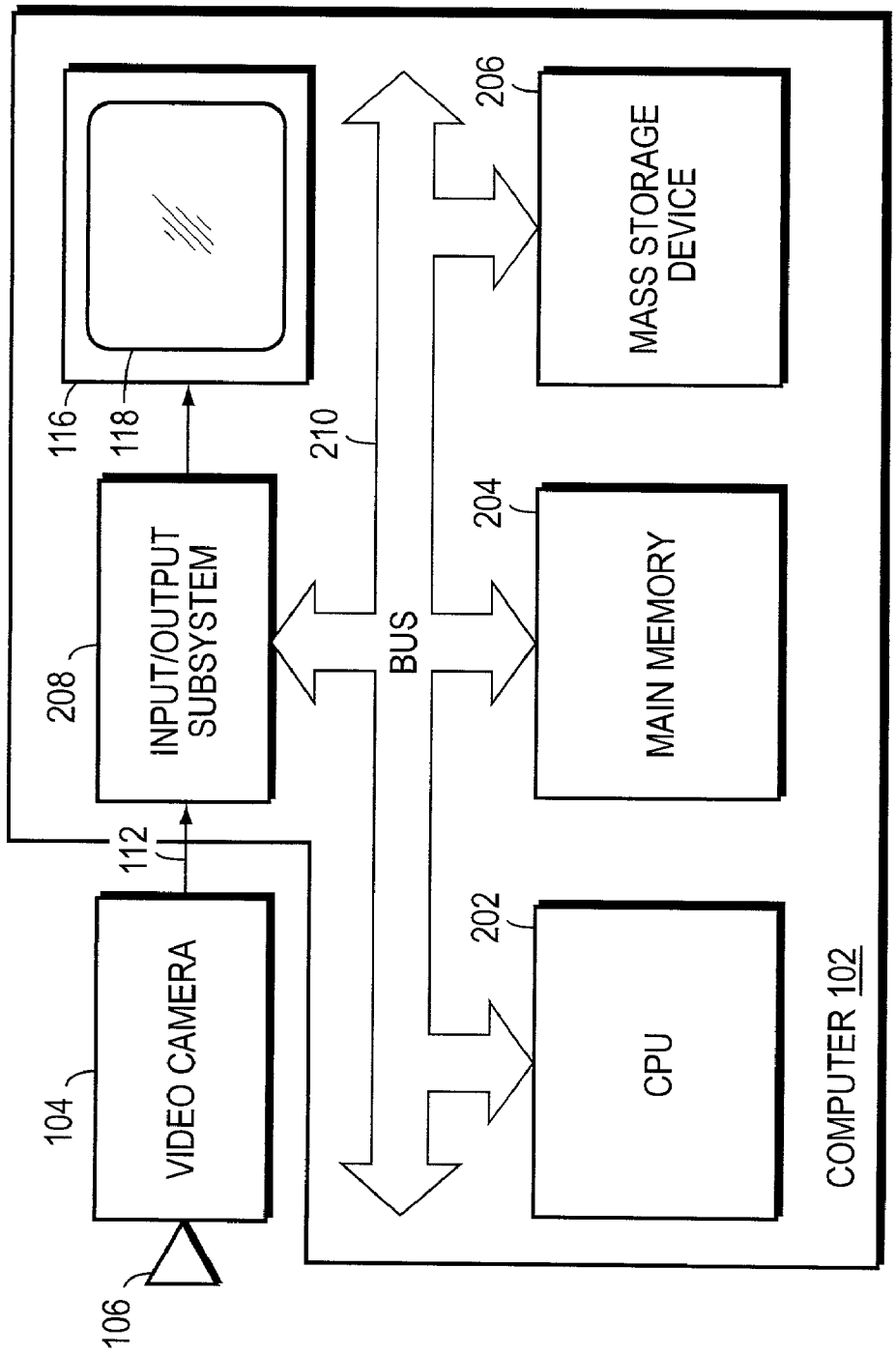
FIG. 2 is a highly schematic, block diagram of the computer component of FIG. 1.

FIG. 1 is a highly schematic illustration of an environment 100 employing the present invention. The environment 100 includes a computer, such as a personal computer 102, a video camera 104 having a lens 106 and a document 108 to be scanned. In a preferred embodiment, the video camera 104 is mounted upon a stand 110 such that the lens 106 is pointing in a downward direction. The stand 110 preferably includes a base 110a. The video camera 104 is also coupled to the computer 102 so that image frames captured by the video camera 104 may be transmitted to and received by the computer 102. For example, the camera 104 may be connected by a cable 112 to a Universal Serial Bus (USB) interface 114 of the computer 102. The computer 102, moreover, preferably includes a monitor 116 having a display screen 118. The computer 102, document 108 and camera stand may all be disposed on a desk 120 having a relatively flat surface 120a FIG. 2 is a highly schematic, block diagram of the computer 102 of FIG. 1 in greater detail. Specifically, computer 102 preferably includes one or more central processing units 202, one or more main memories 204, one or more mass storage devices 206, and an input/output (I/O) subsystem 208 all of which are interconnected by a system bus 210.

Suitable computers for use with the present invention include the Presario and/or Deskpro series of desktop computers from Compaq Computer Corp. of Houston, Tex., and the Power Mac series of computers from Apple Computer Inc. of Cupertino, Calif., among others. Executing on computer 102 is an operating system, such as one of the Windows operating systems from Microsoft Corp. of Redmond, Wash., one of the Mac OS operating system from Apple Computer Inc., or a UNIX operating system. Those skilled in the art will recognize that other computer platforms may also be utilized, such as the Presario and/or Armada series of laptop computers from Compaq Computer Corp., as well as UNIX-based computer workstations.

Video camera 104 is preferably able to take at least 1–2 image frames per second, and includes an auto-focus lens 106. A suitable video camera for use with the present invention is the ViCam USB Digital PC Camera from Vista Imaging, Inc. of San Carlos, Calif. Suitable cameras are also available from 3Com, Xirlink, Kodak, Logitech and Intel, among others.

In the illustrative embodiment, the output of video camera 104 is preferably in the YUV color space (i.e., Y=luminance and U,V=chrominance), where the U and V channels are subsampled by two in both horizontal and vertical directions, so-called 4:2:0 chrominance subsampling.

Figure 3:
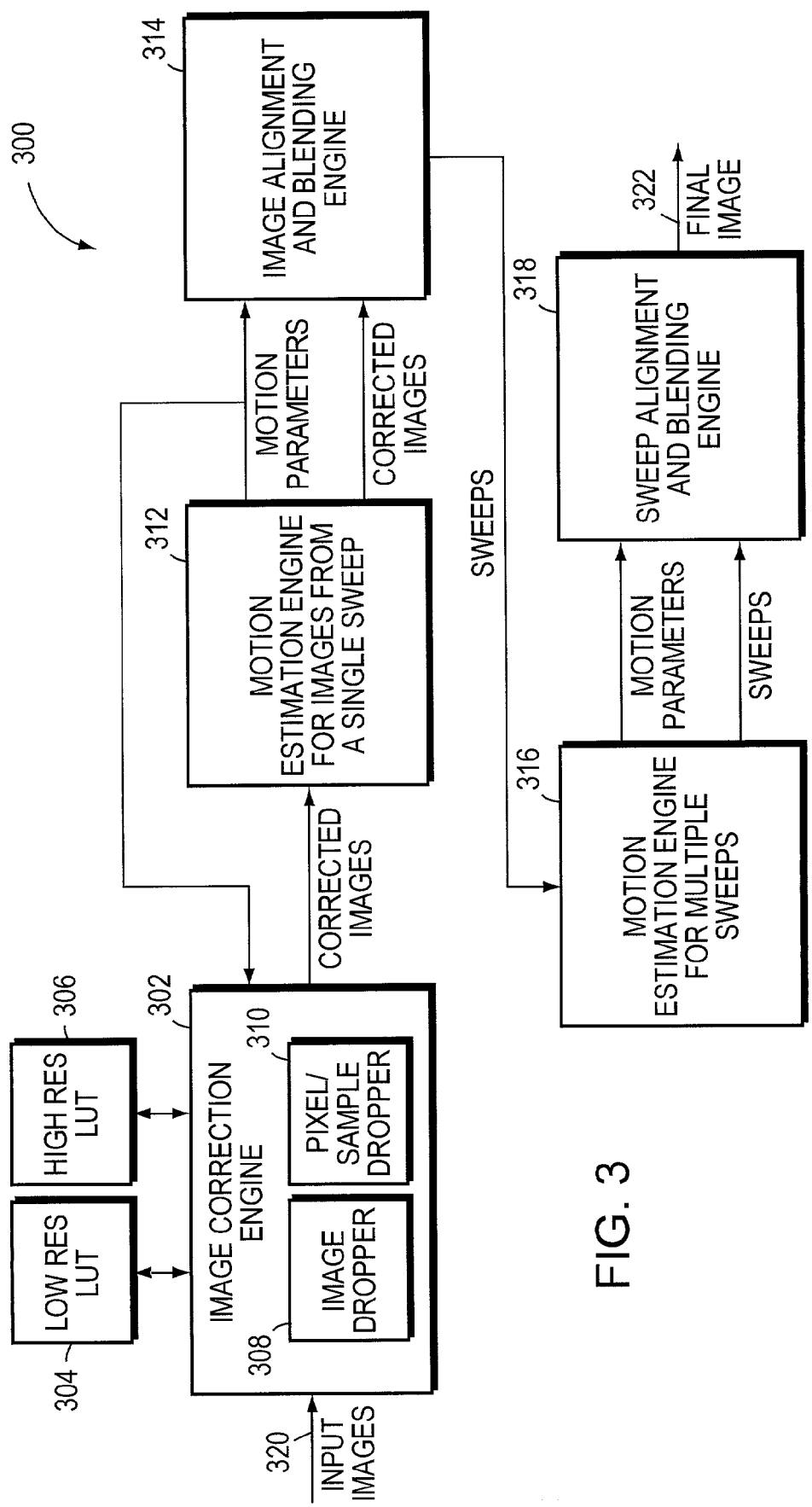
FIG. 3 is a highly schematic, block diagram of the document scanning system of the present invention in accordance with a preferred embodiment.

FIG. 3 is a highly schematic block diagram of the document scanning system 300 of the present invention. System 300 preferably includes an image correction engine 302. Coupled to the image correction engine 302 are a low resolution (res) look-up table (LUT) 304 and a high resolution LUT 306. As described below, LUTs 304, 306 contain correction data for use with the image frames produced by digital video camera 104 (FIG. 1). The image correction engine 302 also includes or otherwise has access to an image dropper entity 308 and a pixel/sample dropper entity 310. System 300 also includes a first motion estimation engine, i.e., motion estimation engine for images from a single sweep 312, which is coupled to or otherwise in communicating relationship with the image correction engine 302. Coupled to first motion estimation engine 302 is a first alignment and blending engine, i.e., image alignment and blending engine 314. Coupled to image alignment and blending engine 314 is a second motion estimation engine, i.e., motion estimation engine for multiple sweeps 316. System 300 further includes a second alignment and blending engine, i.e., sweep alignment and blending engine 318.

In the illustrative embodiment, document scanning system 300 is preferably implemented in the form of one or more computer software application programs, libraries and/or routines. These programs, libraries and/or routines, moreover, can be stored at main memory 204 (FIG. 2) and/or mass storage device 206 and include program instruction for execution by CPU 202. The document scanning system 300 may also be implemented in hardware through a plurality of registers and combinational logic configured to produce sequential logic circuits and cooperating state machines. Alternatively, those various combinations of software and hardware components may be advantageously utilized to achieve the objects of the present invention.

Figure 4:
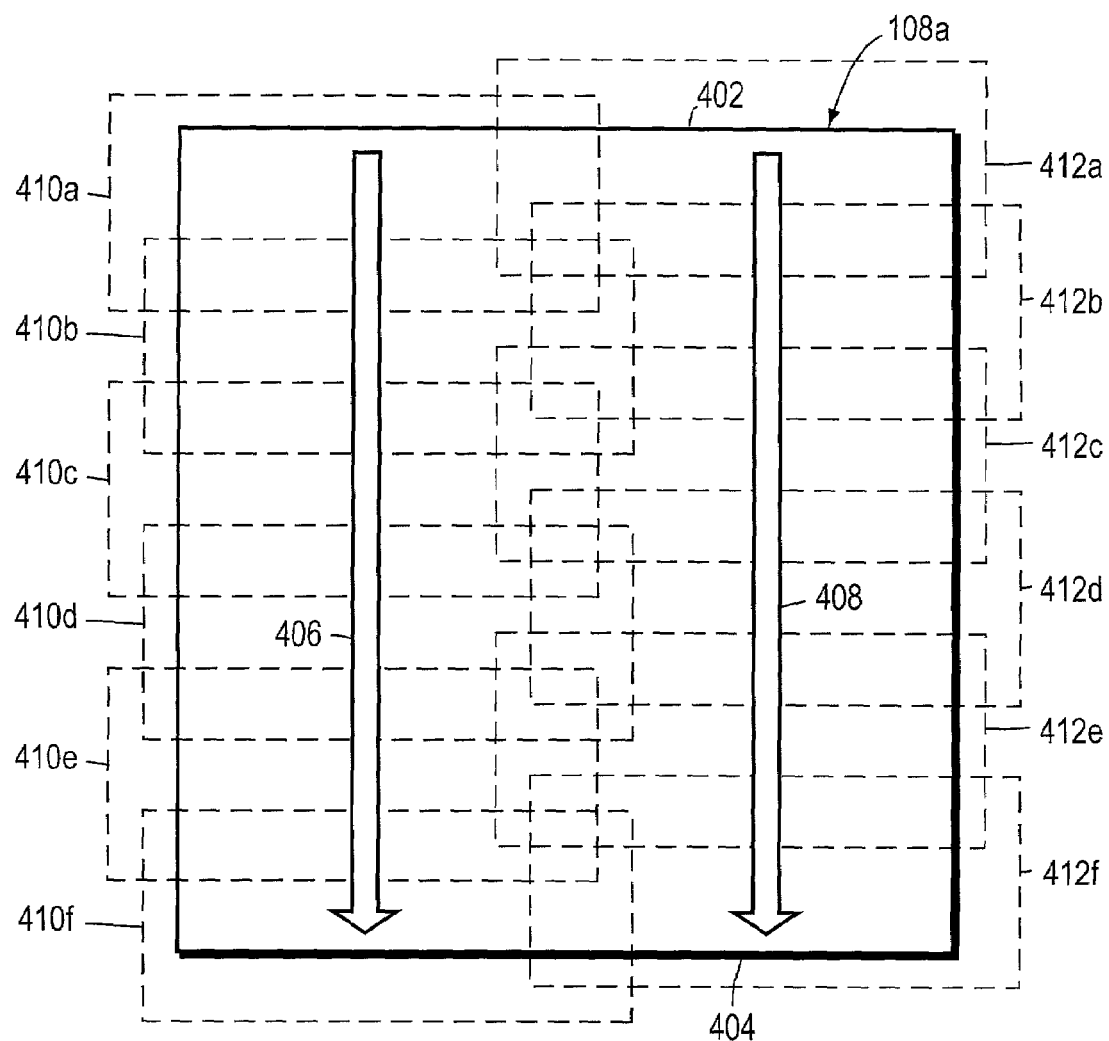
FIGS. 4–5 are illustrations of exemplary sweep patterns utilized by the document scanning system of the present invention.
Figure 5:
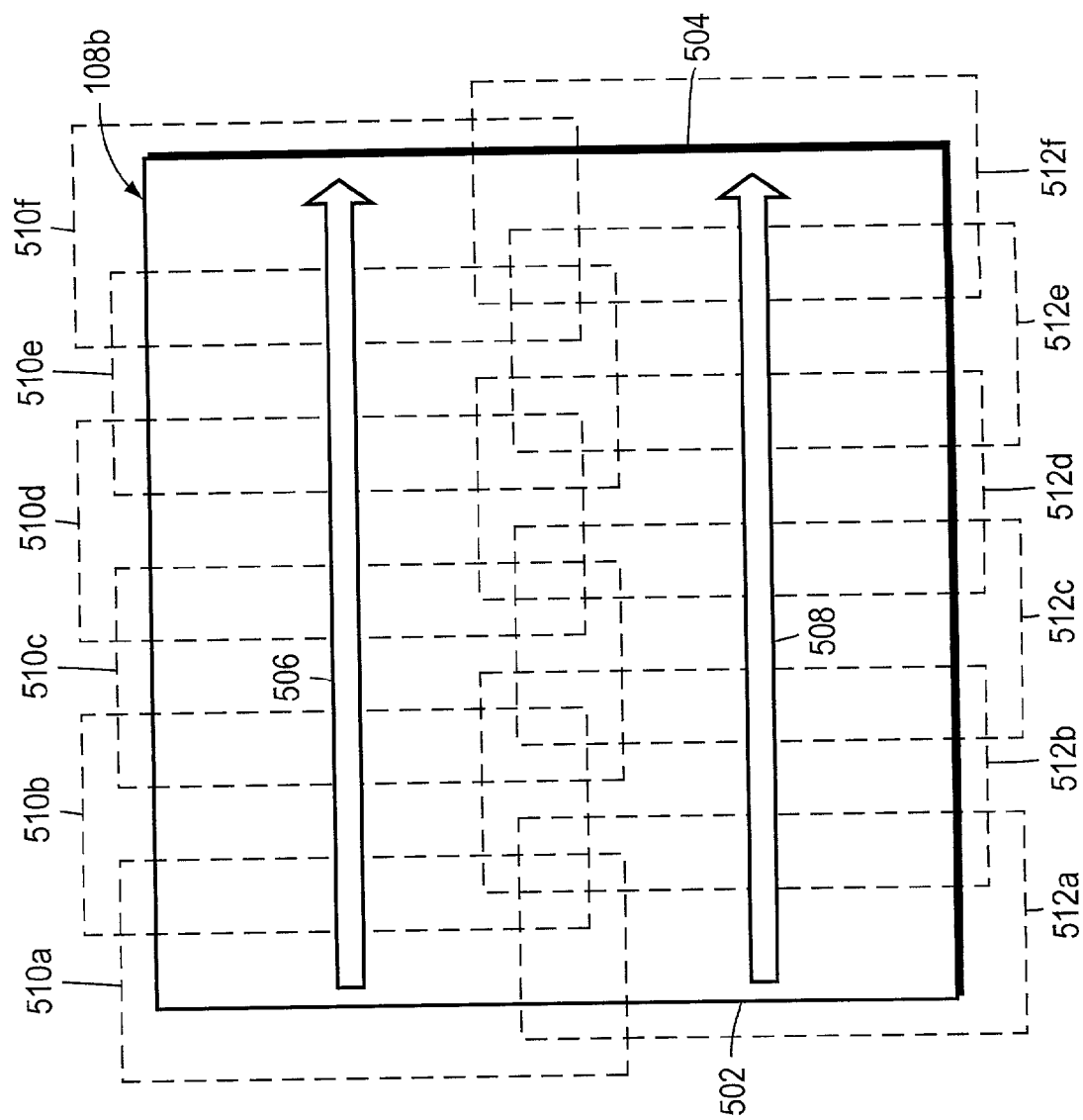

In sum, system 300 receives a series of image frames from video camera 104 of document 108, as illustrated schematically by input arrow 320, and produces a final, composite image of the document 108, as illustrated schematically by output arrow 322. Specifically, a user of the system 300 activates the video camera 104 and uses it to perform a series of "sweeps" of the document 108. FIGS. 4–5 are illustrations of exemplary sweep patterns. FIG. 4, for example, illustrates two sweeps by video camera 104 (FIG. 1) of a document 108a arranged portrait format or orientation and having a top edge 402 and a bottom edge 404. Arrows 406 and 408 represent the two sweeps, i.e., the two paths in which the camera 104 is moved by the user relative to the document 108a. As shown, each sweep 406 and 408 starts at the top edge 402 and terminates at the bottom edge 404 of the document 108a. Boxes 410a–f and 412a–f represent the individual image frames captured by camera 104 during sweeps 406 and 408, respectively. For purposes of clarity, only seven image frames, i.e., boxes 410a–f and 412a–f, are show for each sweep 406 and 408. Preferably, camera 104 is moved slow enough by the user that additional image frames will be captured for each sweep 406, 408. Every portion of document 108a is preferably captured by at least one image frame, i.e., by at least one box 410, 412. Furthermore, consecutive image frames, such as frames represented by boxes 410a and 410b, as well as images frames from consecutive sweeps, such as frames represented by boxes 410a and 412a, overlap so that the motion estimation process, as described below, can be performed.

FIG. 5 illustrates two sweeps by camera 104 of a document 108b arranged in landscape format or orientation and having a left edge 502 and a right edge 504. Arrows 506 and 508 represent the two sweeps taken of the document 108b. Boxes 510a–f and 512a–f represent the individual image frames captured by camera 104 during sweeps 506 and 508, respectfully. As shown, each sweep 506 and 508 starts at the left edge 502 of the document 108b and terminates at the right edge 504. Again, consecutive images for each sweep as well as images from consecutive sweeps overlap each other.

It should be understood that other sweep patterns may be employed with the present invention. For example, for a narrow or thin document, only a single pass or sweep may be needed to capture every portion of the document. For larger documents, three or more sweeps may be taken. The sweeps, moreover, need not be all in the same direction. Those skilled in the art will recognize that other patterns may also be employed.

Before commencing the scanning process, calibration and/or correction data are obtained for the particular camera 104 being used. Many consumer video cameras introduce significant distortions into the captured images. As these distortions would make the document scanning process of the present invention more difficult, they are preferably removed and/or corrected. Two types of camera distortions, off-axis illumination and radial lens distortion, and the distortion caused by imperfect positioning of the camera 104 relative to the stand 110, i.e., camera tilt, are preferably corrected.

Off-axis illumination results in uniform luminance regions in the captured scene being non-uniform in the image plane. It is modeled by the following expression $$I(i,j)=(1+ar^2)^2I'(i,j)$$

where $I(i,j)$ and $I'(i,j)$ are the undistorted and distorted image pixel values at pixel location $(i,j)$, respectively, $r^2=(i-i_c)^2+(j-j_c)^2$ is the square of the distance between the pixel $(i,j)$ and the principal point $(i_c, j_c)$, and a is the off-axis illumination parameter. The principal point is presumed to coincide with the image center.

Radial lens distortion results in a "barreling" effect, where straight lines in the captured scene appear curved in the image plane. Using a second order approximation, it is preferably modeled by the following expressions:

$$i=i_c+(i'-i_c)(1+\kappa_1 r'^2+\kappa_2 r'^4)$$

$$j=j_c+(j'-j_c)(1+\kappa_1 r'^2+\kappa_2 r'^4)$$

where $(i,j)$ and $(i',j')$ are the corresponding pixel locations in the undistorted and distorted images, respectively, $r'^2=(i'-i_c)^2+(j'-j_c)^2$, and $\kappa_1$, and $\kappa_2$ are the radial lens distortion parameters.

A tilt of the camera 104 with respect to the normal of the document plane results in a "keystone" effect. This effect can be modeled by the following transformation:

$$i'=i_c+((H_{00}(i-i_c)+H_{01}(j-j_c))/(H_{20}(i-i_c)+H_{21}(j-j_c)+1))$$

$$j'=j_c+((j-j_c)/(H_{20}(i-i_c)+H_{21}(j-j_c)+1))$$

where $(i,j)$ and $(i',j')$ are the corresponding pixel locations in the undistorted and distorted images respectively, and $H_{00}$, $H_{01}$, $H_{20}$, and $H_{21}$ are the camera tilt parameters.

In order to estimate the off-axis illumination parameter a, the radial lens distortion parameters $\kappa_1$ and $\kappa_2$, and the camera tilt parameters $H_{00}$, $H_{01}$, $H_{20}$, and $H_{21}$, the video camera 104 is calibrated using a test pattern image preferably composed of a series of concentric, black and white squares. The off-axis illumination parameter is estimated by computing the best match such that all white pixels in the corrected image have the same luminance level. Edge detection is then performed using "snakes" to represent the edges. The radial lens distortion parameters are estimated by computing the best match such that all of the snakes, i.e., edges, are straight lines. Camera tilt parameters are estimated by computing the best match, such that all snakes intersect at 90 degree angles. This operation needs only to be performed once, and the resulting parameters are then stored for subsequent usage. If the camera 104 is re-mounted or adjusted to stand 110, the correction process must be repeated as the tilt may have changed.

In accordance with the illustrative embodiment, parameters a, $\kappa_1$, $\kappa_2$, $H_{00}$, $H_{01}$, $H_{20}$, and $H_{21}$, are used to build LUT 304. More precisely, for every pixel $(i,j)$, the LUT 304 has corresponding entry that is composed of two integers $v(i,j)$ and $h(i,j)$, and four floats $c_{00}(i,j)$, $c_{01}(i,j)$, $c_{10}(i,j)$, and $c_{11}(i,j)$, defined below.

First, the radial lens distortion is taken into account through an iterative process defined as:

$$i'_{(k+1)}=i_c+(i-i_c)/(1+\kappa_1 r'^2_{(k)}+\kappa_2 r'^4_{(k)})$$

$$j'_{(k+1)}=j_c+(j-j_c)/(1+\kappa_1 r'^2_{(k)}+\kappa_2 r'^4_{(k)})$$

where $k=0, \ldots, n-1$ denotes the iteration, $(i'_{(0)}, j'_{(0)})=(i,j)$, and $r'^2_{(k)}=(i'_{(k)}-i_c)^2+(j'_{(k)}-j_c)^2$.

Redefining $(i',j')=(i'_{(n)}, j'_{(n)})$, the camera tilt is then considered by the following expressions:

$$i''=i_c+((H_{00}(i'-i_c)+H_{01}(j'-j_c))/(H_{20}(i'-i_c)+H_{21}(j'-j_c)+1))$$

$$j''=j_c+((j'-j_c)/(H_{20}(i'-i_c)+H_{21}(j'-j_c)+1))$$

The values $i''$ and $j''$ are floating point values. Hence, the location defined by $I'(i'', j'')$ does not coincide with the pixel grid. Therefore, as described herein, a weighted sum of the four pixels surrounding the location defined by $I'(i'', j'')$ is used.

The two integers $v(i,j)$ and $h(i,j)$ of LUT entries are given by $$v(i,j)=(int)i''$$

$$h(i,j)=(int)j''$$

Defining $$dv=i''-v(i,j)$$

$$dh=j''-h(i,j)$$

and $$r_{00}^2=(v(i,j)-i_c)^2+(h(i,j)-j_c)^2$$

$$r_{01}^2=(v(i,j)-i_c)^2+(h(i,j)+1-j_c)^2$$

$$r_{10}^2=(v(i,j)+1-i_c)^2+(h(i,j)-j_c)^2$$

$$r_{11}^2=(v(i,j)+1-i_c)^2+(h(i,j)+1-j_c)^2$$

the four floats $c_{00}(i,j)$, $c_{01}(i,j)$, $c_{10}(i,j)$, and $c_{11}(i,j)$ of the LUT entries are given by $$c_{00}(i,j)=(1+ar_{00}^2)^2(1-dv)(1-dh)$$

$$c_{01}(i,j)=(1+ar_{01}^2)^2(1-dv)dh$$

$$c_{10}(i,j)=(1+ar_{10}^2)^2 dv(1-dh)$$

$$c_{11}(i,j)=(1+ar_{11}^2)^2 dv\, dh$$

The high resolution LUT 306 similarly has a corresponding entry for every pixel, and is built in a similar manner. The off-axis illumination, radial lens distortion and camera tilt parameters used to build the high resolution LUT 306 are based on those parameters derived for use in building the low resolution LUT 304, as described above, but are modified by the following expressions:

$$a_{low-res}=4a_{full-res}$$

$$\kappa_{1\,low-res}=4\kappa_{1\,full-res}$$

$$\kappa_{2\,low-res}=16\kappa_{2\,full-res}$$

$$H_{20\,low-res}=2H_{20\,full-res}$$

$$H_{21\,low-res}=2H_{21\,full-res}$$

Once the correction data for camera 104 has been obtained and stored at LUTs 304, 306, the system 300 can be used to scan documents. As described herein, system 300 preferably performs the scanning process in two passes. During the first or on-line pass, the system 300 processes the captured images so as to provide the user with real-time feedback by displaying on screen 118 a relatively low resolution image of the entire document being scanned. In order to perform this processing in real-time, low resolution images are utilized by the system 300, thereby reducing the complexity of the computations that must be performed.

Figure 8A:
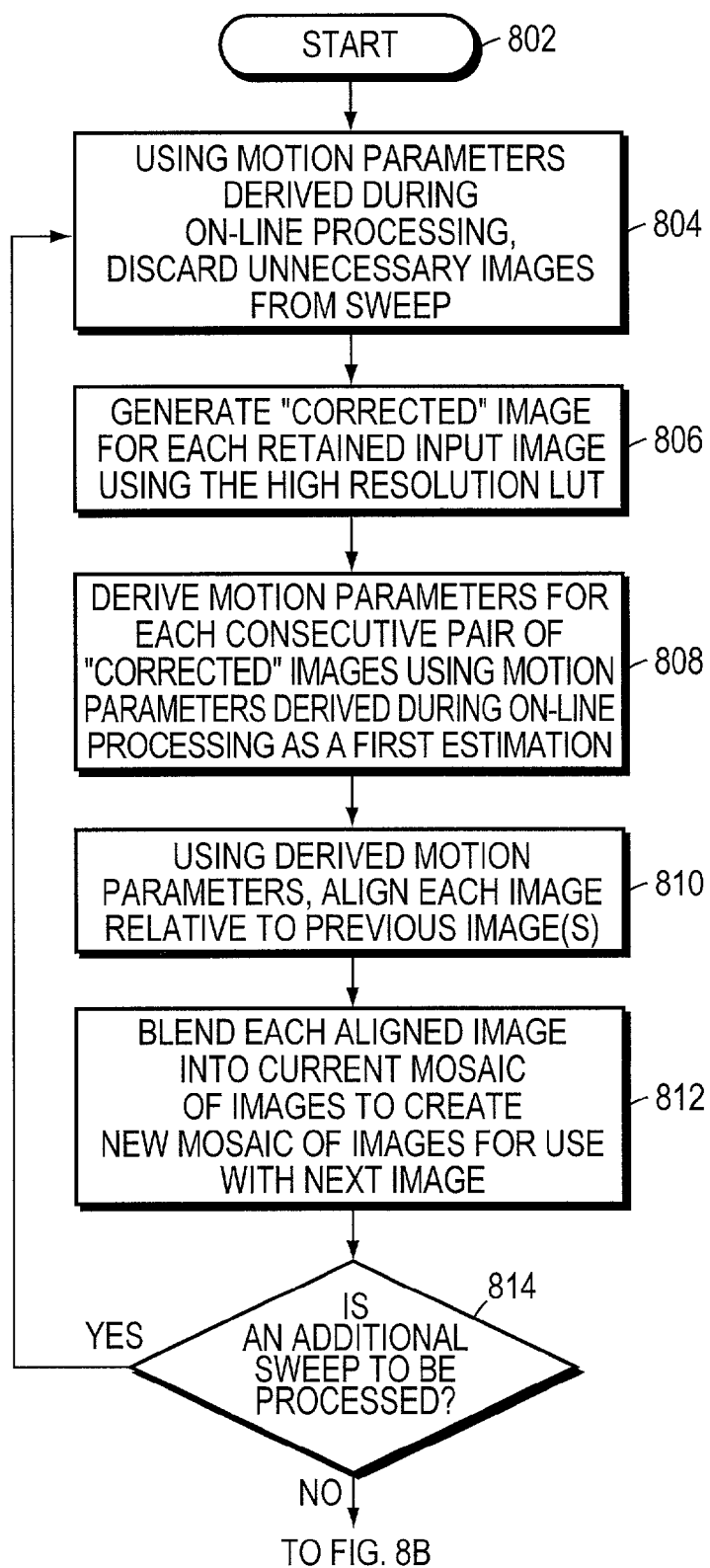

During the second or off-line pass, the system 300 processes the captured images so as to generate a final, composite image of the entire scanned document 108. The second pass is performed using high resolution images captured by the camera 104 during the sweeps of the document 108. FIGS. 6 and 8 are flow diagrams of the methods of the present invention. In particular, FIG. 6 corresponds to the steps performed during the first or real-time pass, while FIG. 8 corresponds to the steps performed to the second or off-line pass. The processing performed during each pass is now described in more detail.

The two-step process of the illustrative embodiment (on-line followed by off-line) is a result of the current limitations in CPU and USB technologies, constraining the rate at which image frames can be captured, transferred to the computer 102 via the USB interface 114 and processed by the CPU 202. With improvements in the rate at which image frames can be captured and transferred to the computer 102 and processed by the CPU 202, the entire process at high resolution could be performed on-line, i.e., in real-time. Even with current CPU and USB technologies, there are at least two possible modes of operation. In the first mode, described in more detail below, low resolution images from each sweep are processed, stitched together and displayed on-line to provide feedback to the user. Then, high resolution images are processed and stitched together off-line for display or storage. In a second mode, low resolution images are processed and displayed, but not stitched together, on-line to provide some feedback to the user, followed by the processing and stitching together of high resolution images off-line.

On-line Processing

First, the document of interest, e.g., document 108 (FIG. 1), is preferably placed on a relatively flat surface, such as the top 120a of desk 120. Next, the user opens or runs the application program(s) corresponding to the document scanning system 300 (FIG. 3) on the computer 102. Suppose that the document 108 being scanned is in portrait format or orientation and that the user plans to make two vertical sweeps of the document 108 as illustrated in FIG. 4. Scanning system 300 is preferably initialized with this information. In particular, scanning system 300 may generate one or more graphical user interfaces (GUIs) and display them on screen 118. The GUI may prompt the user to enter information such as the orientation (e.g., portrait or landscape) of the document being scanned, its size (e.g., 8½ by 11 inches, 11 by 14 inches, etc.), and the type and number of sweeps to be performed (e.g., two vertical sweeps both starting from the top edge of the document and terminating at its bottom edge).

Figure 6A:
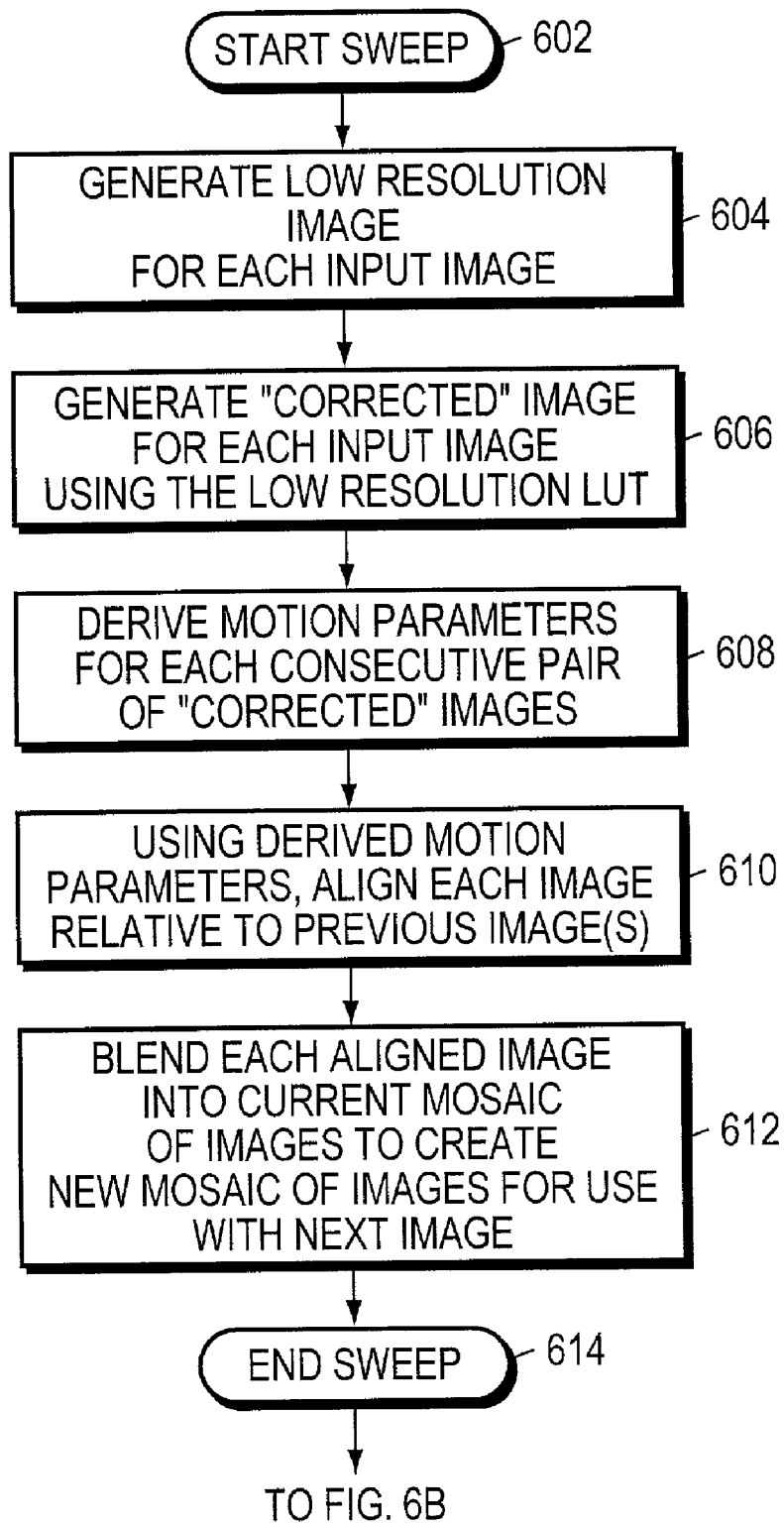
FIGS. 6–8 are flow diagrams of the methods of the present invention.
Figure 6B:
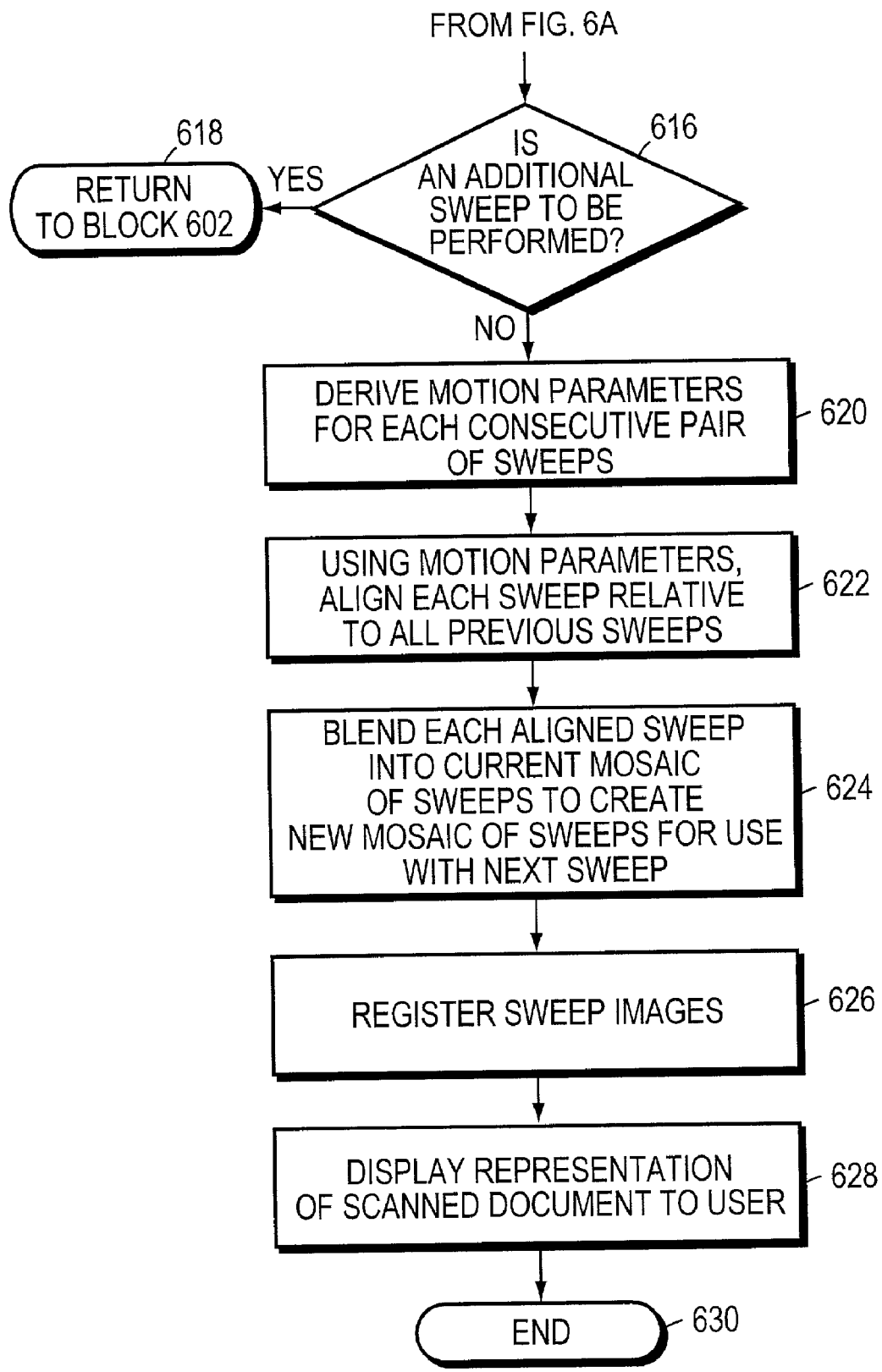

Referring to FIGS. 6A and 6B, the user then starts the first sweep as indicated at block 602 (FIG. 6A). More specifically, the user activates the video camera 104 and moves it relative to the document 108 in the manner of the selected sweep (e.g., in a vertically downward direction starting at the document's top edge 402 and terminating at its bottom edge 404). The user may move the camera 104 either by grasping the camera 104 itself or by grasping the stand 110 to which it has been mounted. In any event, the base 110a of the stand 110 preferably remains on the desk surface 120a during the sweep so that the camera's focal length remains substantially the same throughout the sweep. In addition to activating the camera 104, the user may also select a button displayed on the GUI to indicate that the user is about to begin the first sweep.

Each individual image frame captured by the camera 104 is passed via cable 112 to computer 102. The operating system of computer 102 passes the image frames to the document scanning system 300 in a conventional manner where they are received by the image correction engine 302 as indicated by arrow 320. As this is the first or on-line pass, low resolution images are created, as indicated at block 604. Low resolution images are preferably obtained by subsampling the full resolution images produced by the video camera 104 in both the horizontal and vertical directions. In a preferred embodiment, subsampling is performed by simply discarding one out of two samples in both the horizontal and vertical directions to produce the low resolution images. Next, the image correction engine 302 generates a "corrected" image frame for each low resolution image frame using the correction data stored at low resolution LUT 304, as indicated at block 606. Specifically, each pixel value, I'(i, j), of the received, i.e., distorted, image frame is converted into a corrected pixel value, I(i, j) through bilinear interpolation as provided by the following equation:

$$I(i, j) = (\text{int})(c_{00}(i, j)I'(v(i, j), h(i, j)) + c_{01}(i, j)I'(v(i, j), h(i, j)+1) + c_{10}(i, j)I'(v(i, j)+1, h(i, j)) + c_{11}(i, j)I'(v(i, j)+1, h(i, j)+1) + 0.5)$$

Corrected image frames are then passed to the first motion estimation engine 312 which processes the images from a single sweep. Motion estimation engine 312 compares every pair of consecutive or sequential corrected image frames and derives a plurality of motion parameters that describes the motion of the current image frame relative to the previous image frame, as indicated at block 608. In the illustrative embodiment, motion estimation is only performed on the Y component of the signal, and the resulting motion parameters are scaled for the U and V components. For example, if the displacement of a luminance pixel is given by the displacement (dx, dy), the displacement of the corresponding chroma pixel would be (dx/2, dy/2).

As described in more detail below, the preferred method for deriving the motion parameters is based upon a hierarchical iterative gradient descent that minimizes the sum of squared differences between the previous image (I) and the motion-compensated current image (I'). That is, the current image (I') is moved relative to the previous image (I) in an iterative fashion until the sum of squares reaches a minimum value. The total movement that must be made to the current image frame relative to the previous image in order to minimize the sum of squares differences between the two image frames determines the motion parameters. The summation that is utilized is represented by the following equation:

$$E = \sum_{i,j} e^2(i, j)$$

with, $e(i, j) = I(i, j) - I'(i', j')$ where (i, j) and (i', j') are the corresponding pixel locations in the previous and current image, respectfully, and the summation is carried out over all pairs of pixels (i, j) and (i', j') within overlapping image boundaries. In other words, as the image frames for each sweep of the document are sequential, each "current" image is displaced with respect to and yet overlaps, at least in part, the previous image. The motion of the current image relative to the previous image is derived for this region of overlap. The motion model may be defined as follows:

$$i' = (m_0 + m_2 i + m_3 j)/(m_6 i + m_7 j + 1)$$

$$j' = (m_1 + m_4 i + m_5 j)/(m_6 i + m_7 j + 1)$$

where, $m_0, m_1, m_2, \ldots m_7$ are the eight motion parameters. To simplify the procedure, the translation model (two motion parameters) is assumed for the first pass, i.e., $m_2 = m_5 = 1$, and $m_3 = m_4 = m_6 = m_7 = 0$). The two remaining motion parameters i.e., $m_0$ and $m_1$, are derived by minimizing E from the above equation. As the dependence of E on the motion parameters m is nonlinear, the following iterative gradient descent method is preferably utilized:

$$m^{(t+1)} = m^{(t)} + H^{-1} b$$

where, $m^{(t)}$ and $m^{(t+1)}$ denote m at iteration t and t+1 respectively, H is an n×n matrix of elements $H_{kl}$, with n being the number of motion parameters being utilized (e.g., "2" for the first pass), and b is an n-element vector whose coefficients are given by:

$$H_{kl} = \frac{1}{2} \sum_{i,j=1} \frac{\partial^2 e^2(i,j)}{\partial m_k \partial m_l} \cong \sum_{i,j=1} \frac{\partial e(i,j)}{\partial m_k} \frac{\partial e(i,j)}{\partial m_l}$$

and $$b_k = -\frac{1}{2} \sum_{i,j=1} \frac{\partial e^2(i,j)}{\partial m_k} = -\sum_{i,j=1} e(i,j) \frac{\partial e(i,j)}{\partial m_k}$$

In order to further reduce computational complexity, a low-pass image pyramid is also used. The gradient descent is applied at the top of the pyramid and then iterated at each level until convergence is achieved.

Figure 7:
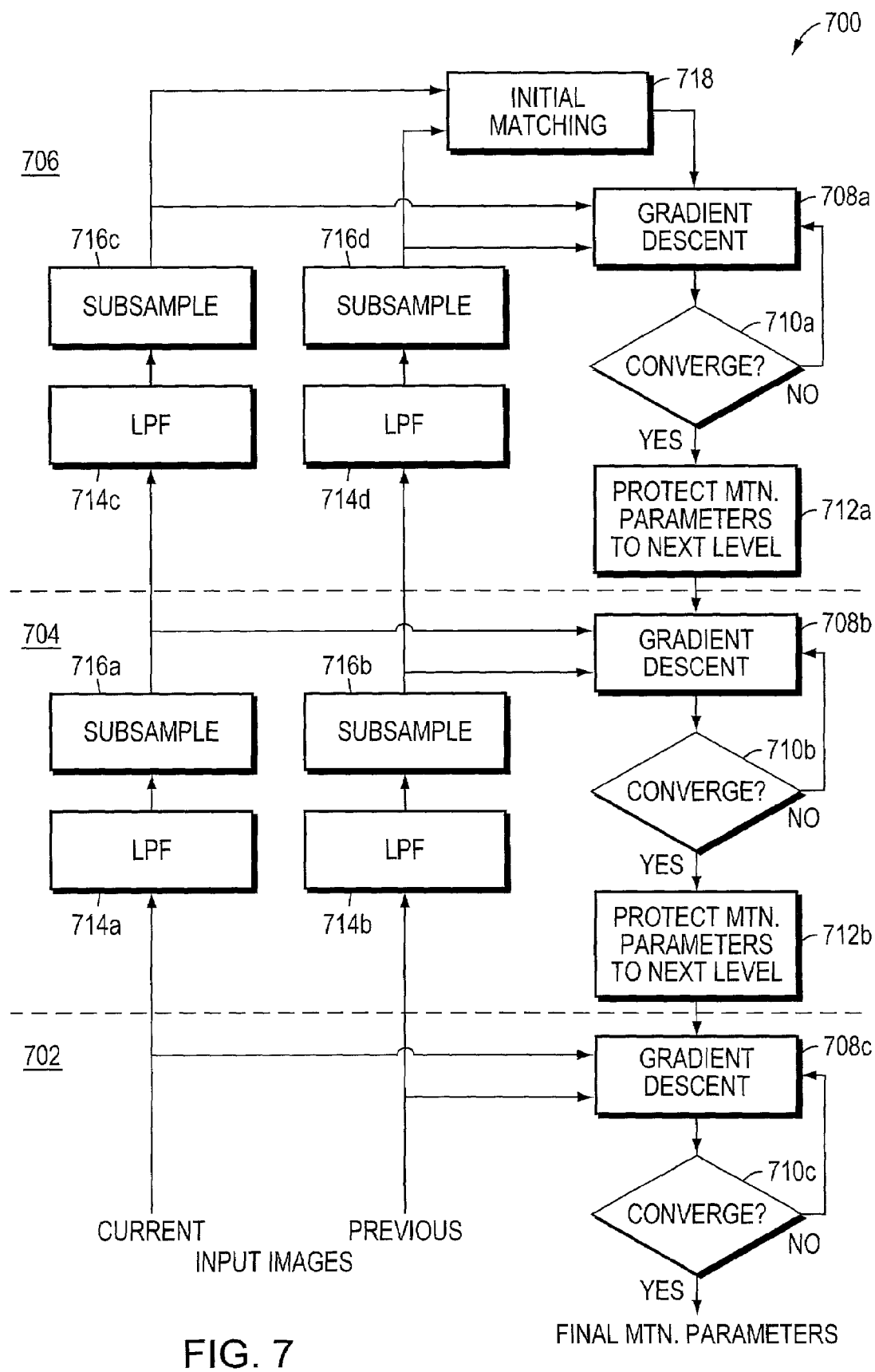

FIG. 7 is a highly schematic illustration of a preferred low-pass image pyramid 700 used by the motion estimation engine 312. The image pyramid has three levels, a first or lower level 702, a second or middle level 704 and a third or top level 706. Each level of the pyramid 700 includes iterative gradient descent and convergence operations 708a–c and 710a–c, respectfully. The output from the gradient descent and convergence operations 708, 710 are a set of motion parameters (i.e., $m_0$ and $m_1$ for the first pass). For the upper two levels 704, 706, these motion parameters are projected to the next lower level as indicated at blocks 712a–b for use as an initial estimation of the motion parameters at that next lower level. At the first level 702, the output of the gradient descent and convergence operations 708c, 710c are the final motion parameters for the respective pair of consecutive image frames. The image frames are filtered and subsampled at the two higher levels 704, 706 in order to reduce complexity and speed up convergence to the final motion parameters.

Specifically, both the middle and top levels 704, 706 include low pass filters (LPFs) 714a–d and subsample engines 716a–d. A separate LPF and subsample engine are preferably provided at each upper level 704, 706 for the current image frame and the previous image frame being processed. By removing the high frequency components, the LPFs 714 smooth the image before subsampling. The subsample engines 716 at each level 704, 706 discard every fourth pixel or sample from both the current and the previous image frames in both the horizontal and the vertical directions. In other words, the same current and previous images are processed at each level 702, 704, 706 of the pyramid 700, but those images are represented by fewer pixels, and thus have a lower resolution as compared to the next lower level. In particular, the images processed at the middle level 704 have one-fourth fewer pixels than the original images, and the images processed at the top level 706 have one-sixteenth fewer pixels than the originals.

It should be understood that other subsample ratios may be used.

To assure convergence in the presence of large displacements between consecutive image frames, an initial coarse estimate of the translation component (i.e., image parameters $m_0$ and $m_1$) is preferably computed by applying a full-search matching algorithm at the top level 706 of the pyramid 700, as indicated by initial matching operation 718.

The preferred matching algorithm minimizes the following expression:

$$\sum_{i,j} |I(i,j) - I'(i' + m_0, j' + m_1)|$$

using an exhaustive search of the parameters ($m_0, m_1$) in a search area defined by $m_0\_min$, $m_0\_max$, and $m_1\_min$, $m_1\_max$. The pair ($m_0, m_1$) that results in the minimum is selected as the translation vector for the initial coarse estimate.

It should be understood that a non-exhaustive search, such as an n-step search, could be used in place of the exhaustive search. Furthermore, other measures, such as a Mean Square Error, would also be suitable.

Knowledge of the selected scanning pattern is exploited by the initial matching operation 718 to suggest a search area. As mentioned above, the document 108 being scanned is in portrait orientation and two side-by-side sweeps are being made as illustrated by FIG. 4. This information is used by the initial matching operation 718 to suggest or anticipate the displacement or movement of the current image relative to the previous image (i.e., down). Knowing that the motion is essentially in one direction, the search area can be represented by a rectangle that is larger in the direction of motion. A suitable search area is [−2, +2] by [−2, +16] pixels, where +16 corresponds to the direction of motion of the sweep. This corresponds to a motion estimation of 2 pixels in three directions and 16 pixels in one direction at the top level 706 of the pyramid (low resolution image), and translates to a motion estimation of 8 pixels in three directions and 64 pixels in one direction at the base or lower level 702 of the pyramid (high resolution image). The anticipated motion parameters from the initial matching entity 718 are then provided to the gradient descent operator 708a of the top level 706 along with the subsampled and filtered current and previous images.

The gradient descent operator 708a performs an iterative process, adjusting the motion parameters at each iteration until they converge as detected by convergence operator 710a. Upon convergence, the converged motion parameters are then projected to the gradient descent operator 708b of the middle level 704 for use as the initial estimate of the motion parameters. It should be understood that the converged motion parameters from level 706 may need to be adjusted before being projected to level 704 as the resolution of the images processed at levels 704 and 706 is different. As indicated above, the output of the gradient descent and convergence operators 708c, 710c at the first or lowest level 702 are the final motion parameters for the corresponding pair of consecutive images being processed.

In order to limit the influence of individual pixels that may significantly bias the motion parameters suggested by the remaining pixels (e.g., "outliers"), a truncated quadratic error function as defined by the following equation may be employed:

$$E = \sum_{i,j=1} \rho(e(i, j))$$

$$\text{with } \rho(e(i, j)) = \begin{cases} e^2(i, j) & \text{if } |e(i, j)| \leq T \\ 0 & \text{if } |e(i, j)| > T \end{cases}$$

where T is a predefined threshold.

Specifically, at the top level 706 of the pyramid 700, the regular summation equation described above, namely, $$E = \sum_{i,j} e^2(i, j)$$

is used at the first iteration. Next, the threshold, T, is computed by eliminating approximately 10% of the pixels from the summation. That is, T corresponds to that value which is greater than 90% of the computed |e(i, j)| values, thereby keeping approximately 90% of the pixels in the summation.

For subsequent iterations at levels 706, 704 and 702, the truncated quadratic error function described above is used, namely, $$E = \sum_{i,j=1} \rho(e(i, j))$$

using the previously computed value for T. A new value for T is then computed based on the e(i, j) values during the first iteration at the second level 704, and during the first iteration at the first level 702.

It should be understood that other values for T may be used. Preferably, T is chosen such that 5–15% of the pixels are dropped, i.e., 85–95% are kept for use in the respective summations.

Once the motion parameters for the current image have been derived, the current image is added or stitched to all of the previous images so as to create a new mosaic of images. Specifically, the motion parameters and the corrected images are passed by the first motion estimation engine 312 (FIG. 3) to the image alignment and blending engine 314. Engine 314 uses the received motion parameters to first align the current image to the mosaic of previous images, as indicated at block 610 (FIG. 6A). More specifically, coordinates (i, j) in the mosaic are scanned, and the "warped" coordinates (i', j') in the current image are simply computed using ($m_0$, . . . , $m_7$). Generally, (i', j') will not coincide with the integer-pixel grid. Therefore, I'(i', j') is evaluated by bilinear interpolation of the surrounding pixels.

Next, the aligned image is blended into the current mosaic to form the new mosaic for use with the next image frame in sequence, as indicated at block 612 (FIG. 6A). For spatial locations where no data exists in the mosaic, but a pixel is available from the "warped" image, the latter is used to initialize the mosaic content. For spatial locations where a pixel is available both in the mosaic and in the warped image, the two values are combined. For this purpose, a simple average can be used. However, this may result in blurring in case of mis-registration. Accordingly, the warped image pixel is preferably pasted on top of the existing pixel in the mosaic. Alternatively, it is possible to keep track of the distance between a warped pixel and its image center. Each time a mosaic pixel is updated, this distance is associated with the location and stored. A warped pixel is pasted in the mosaic only when its distance is smaller than the one stored for the current mosaic pixel.

When the last image of the sweep has been processed, e.g., aligned and blended into the mosaic, processing of the sweep is complete, as indicated by end block 614. At this point, system 300 has created a single composite image for the respective sweep (e.g., the first of two vertical sweeps of a portrait oriented document). The user may deactivate the video camera 104 and/or select a displayed button on the GUI to inform the system 300 that the respective sweep is complete. If one or more additional sweeps are to be performed (e.g., the second of two vertical sweeps), steps 602–614 are repeated, as indicated by decision block 616 (FIG. 6B) and block 618, which return processing to step 602 if additional sweeps are to be performed.

Once the last sweep has been taken by the user and the mosaic image for each sweep has been created, the system 300 proceeds to stitch together the mosaic images into a single, unified image of the entire document 108. This process is similar to the one used to create the mosaic images of the individual sweeps. Specifically, the mosaic image generated for each sweep is passed to the motion estimation engine for multiple sweeps 316. Engine 316, in turn, derives motion parameters for each pair of consecutive sweep images, as indicated at block 620. Engine 316 similarly employs a hierarchical iterative gradient descent approach that minimizes the sum of squared differences between a previous sweep image (I) and a motion-compensated current sweep image (I'), as described above in connection with FIG. 7.

As indicated above, when performing each sweep with the video camera 104, the user should make sure that there is some overlap between each sweep to ensure that the motion estimation process can be performed. Overlap on the order of 20% has been found to be sufficient. Overlap may also be constrained by some upper limit, such as 40%. Motion estimation engine 316 may also make one or more assumptions regarding the relative displacement of consecutive sweeps. For a document in portrait orientation or format, each successive sweep may be horizontally displaced to the right relative to the previous sweep. For a document in landscape orientation or format, each successive sweep may be vertically displaced in a downward direction relative to the previous sweep. All of this information can then be used by the initial matching operation 718 at the top level 706 of pyramid 700 (FIG. 7) to make an initial estimate of the motion parameters for consecutive sweeps.

The derived motion parameters and the sweep images are passed to the sweep alignment and blending engine 318 (FIG. 3). Engine 318 uses the received motion parameters to align each current sweep image relative to the mosaic of previous sweep image(s), as indicated at block 622. Next, engine 318 blends each current sweep image into the mosaic of previous sweep image(s), as indicated at block 622. The alignment and blending processes are preferably the same as described above in connection with the individual image frames.

Alignment and blending engine 318 may also be configured to perform additional processing of the sweeps to improve alignment. That is, engine 318 may perform a registration process on the sweep images, as indicated at block 626. For example, engine is 318 may perform a spline-based image registration technique. A suitable spline-based image registration technique is described in U.S. Pat. No. 5,611,000, issued Mar. 11, 1997 and entitled Spline-Based Image Registration, which is hereby incorporated by reference in its entirety. Alternatively, the motion parameters derived for each pair of consecutive image as well as for the consecutive sweeps themselves can be re-estimated in an effort to refine the composite image. During the re-estimation, each image may be compared to an ever-changing mosaic image formed from all previous images in order to derive the respective motion parameters, rather than estimating the motion between each pair of consecutive images as was done during the first estimation.

The composite image of the entire document 108 is then displayed on screen 118 (FIG. 1) for review by the user, as indicated at block 628. If the displayed image contains holes or gaps and/or seems out of alignment, the user can use the video camera 104 to repeat the scanning process. Assuming the displayed image appears acceptable to the user, the first pass processing is now complete, as indicated by end block 630.

Off-line Processing

System 300 next performs off-line processing in order to generate an improved composite, image of the document 108 being scanned having better resolution than the one generated deriving on-line processing. This process is described at FIGS. 8A-8B. The process preferably commences at start block 802 (FIG. 8A) with the images taken during the sweep(s) of the document. First, the image dropper entity 308 of image correction engine 302 discards each image that is considered to be too close to its prior image based on the previously derived motion parameters for the images, as indicated at block 804. Specifically, engine 302 may apply a predetermined threshold to the motion parameters derived for the images. Those images that fall below the predetermined threshold are discarded. A suitable threshold is approximately 40 pixels. That is, an image that is displaced less than 40 pixels from the previous image is discarded. By eliminating those images that are not sufficiently different from other images that are to be processed, the computational complexity of the scanning process is reduced.

Those skilled in the art will understand that other thresholds may be employed with the present invention.

Next, the image correction engine 302 generates a "corrected" image from each retained image frame based on the information in the high resolution LUT 306, as indicated at block 806. Thus, unlike the on-line processing approach in which the image frames are subsampled and the low resolution LUT 308 is used to generated the "corrected" images, during off-line processing all pixels of the image frames are used. These corrected images are passed to the first motion estimation engine 312 which derives motion parameters for consecutive images using the summation and pyramid techniques described above, as indicated at block 808. In this case, however, engine 312 utilizes the motion parameters derived during on-line processing as an initial condition at the top level 706 of the pyramid 700 in order to speed up processing and improve convergence.

Engine 312 also derives four motion parameters for each pair of consecutive image frames and consecutive sweep images, rather than just two. Specifically, rather than assume that $m_2=m_5=1$, and $m_3=m_4=m_6=m_7=0$ as was done during the first or on-line processing of the images, this time engine 312 assumes only that $m_5=m_2$, that $m_4=-m_3$ and that $m_6=m_7=0$, thereby resulting in four motion parameters, $m_0$, $m_1$, $m_2$, and $m_3$. The motion parameters derived by engine 312 and the corrected images are then passed to image alignment and blending engine 314. Engine 314 aligns and blends each current image into the mosaic of previous images forming the sweep, as indicated at blocks 810 and 812. The alignment and blending process is similar to that described above.

Figure 8B:
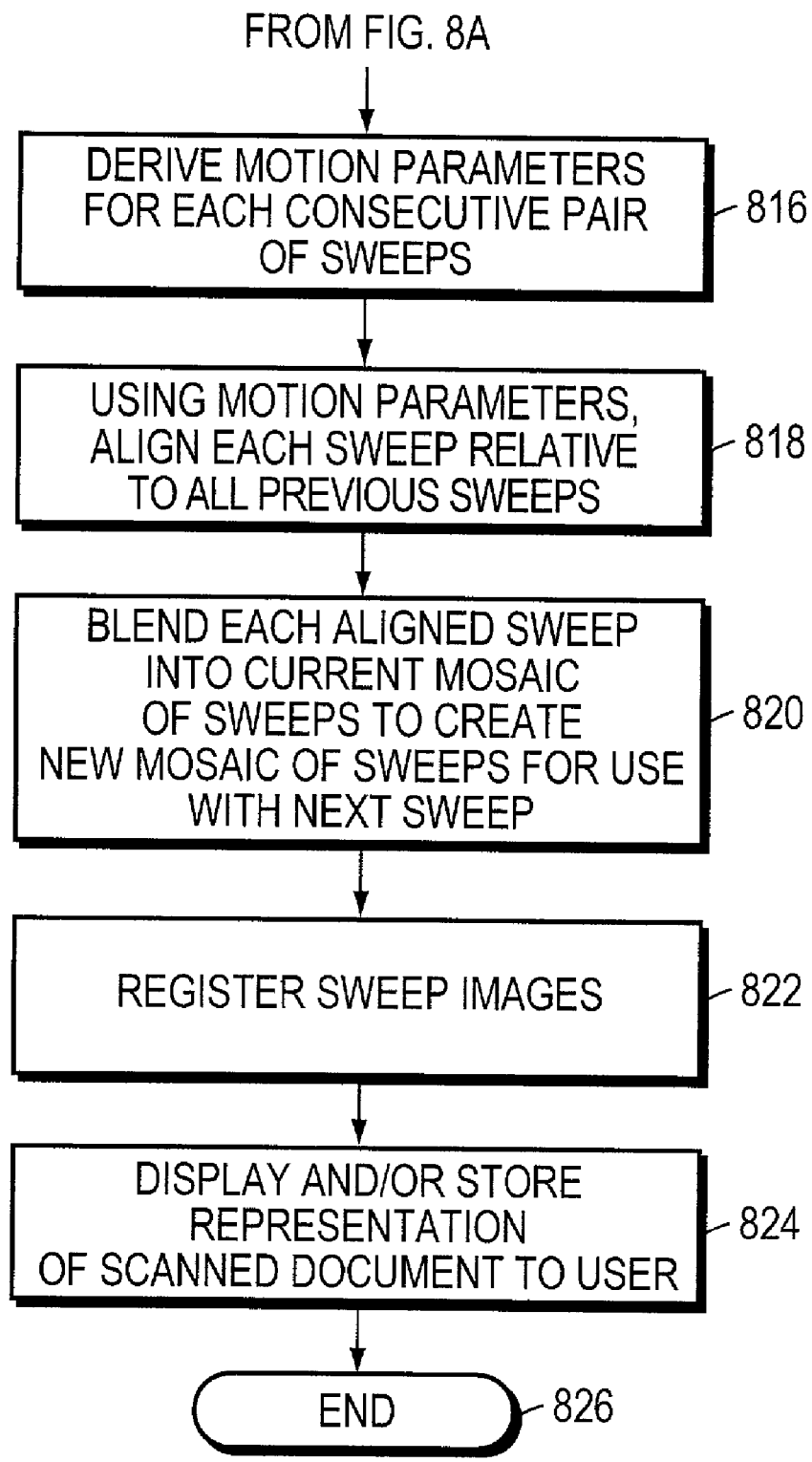

System 300 then determines whether images from another sweep are to be processed, as indicated at decision block 814. If so, processing returns to step 804 and the images from this next sweep are processed in a similarly manner. Once a composite image for each sweep has been generated, these sweep images are passed to the second motion estimation engine 316, which, in turn, derives four motion parameters for each pair of consecutive sweeps, as indicated at block 816 (FIG. 8B). These motion parameters as well as the sweep images are passed to sweep alignment and blending engine 318. Engine 318 aligns and blends each sweep image into the mosaic of previous sweep images, as indicated at blocks 818 and 820. Engine 318 may also register the sweep images, as indicated at block 822. The final, composite image of the entire document may then be displayed on screen 118 and/or stored at mass storage device 206, as indicated at block 824. Off-line processing is now complete, as indicated by end block 826.

Figure 10:
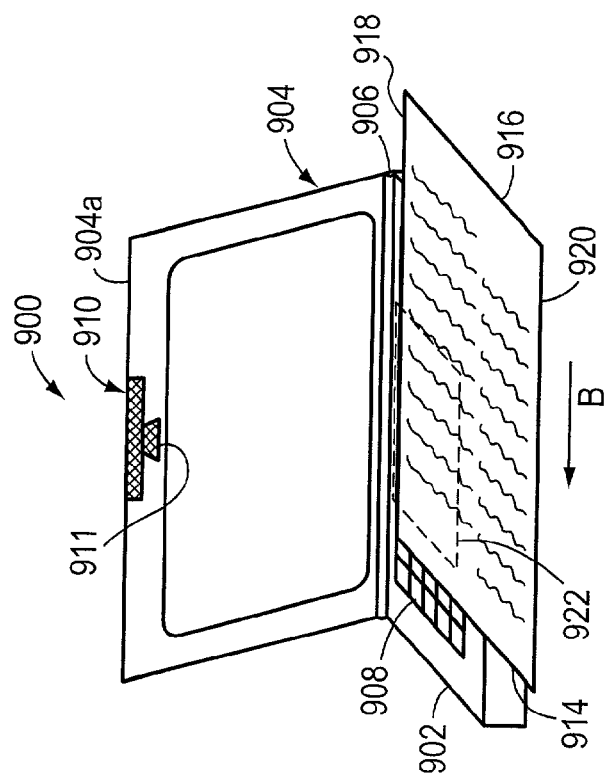
FIGS. 9 and 10 illustrate another embodiment of the present invention.
Figure 9:
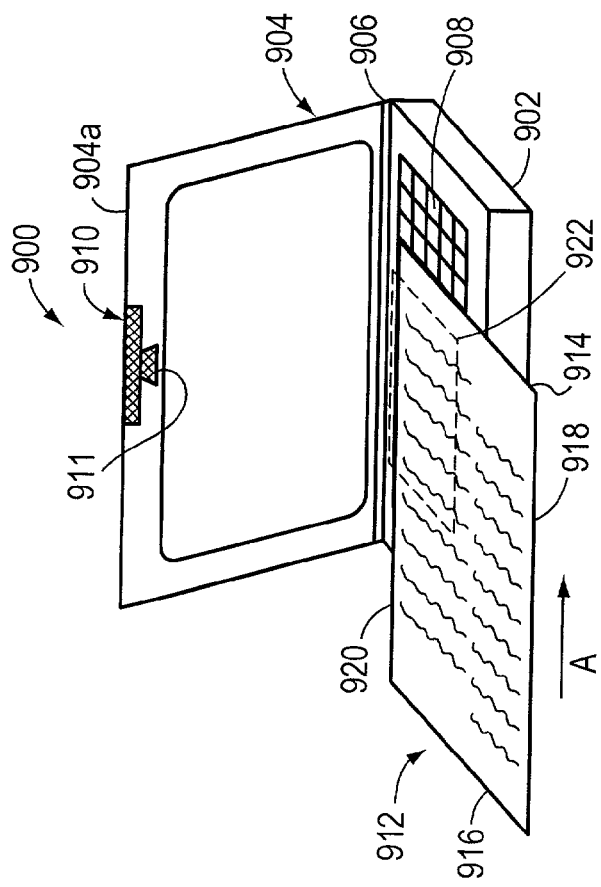

The scanning system of the present invention can also be incorporated within other computer platforms, such as a laptop or notebook computer. FIGS. 9 and 10 each illustrate a notebook computer 900 having a base 902 pivotally attached to a display panel 904 by a hinge 906. Disposed on the base 902 is a keyboard 908. Mounted to an edge 904a of the display panel 904 opposite the hinge 906 is a built-in digital camera 910 (which may either be a motion or still camera) having a lens 911. The notebook computer 900 is preferably configured with the document scanning system of the present invention. For example, program instructions corresponding to the method of the present invention may be stored on a memory device, such as a Random Access Memory (RAM) and/or hard drive (not shown), of the notebook computer 900.

Suitable notebook computer platforms for use with the present invention having built-in video cameras include the Vaio C1 PictureBook series of notebook computers from Sony Corp. of Tokyo Japan.

In operation, a document 912 to be scanned having top 914, bottom 916, right side 918 and left side 920 edges is placed on the base 902 on top of the keyboard 908. In particular, the document 912 is positioned so that left side edge 920 is proximate to the hinge 906. Display panel 904 and/or camera 910 are also positioned so that the lens 911 is pointed down toward the document 914 which is resting on the base 902. The camera 910 thus defines an image area 922 on the base 902. The user then activates the document scanning system of the present invention, as described above, and moves the document 912 in the direction of arrow A (FIG. 9), thereby causing the camera 910 to capture a sequence of images corresponding to a sweep of the left side of the document 912. The user preferably begins with the document far enough to the left and moves it far enough to the right so as to ensure that the entire left side from top 914 to bottom 916 is captured in a plurality of image frames.

After imaging the left side of the document 912, the user preferably flips the document around so that the right side edge 918 is now proximate to the hinge 906 of the notebook computer 900 as shown in FIG. 10. The user moves the document in the direction of arrow B (FIG. 10), thereby causing the camera 910 to capture a sequence of images corresponding to a sweep of the right side of the document 912. With this embodiment, the scanning system recognizes that the two sweeps are in opposite directions relative to each other. Accordingly, prior to processing, one of the sets of images is flipped around so that the two sweeps can be stitched together into a single, final image of the entire document 912. The on-line and off-line processing of the captured images is preferably the same as that described above.

It should be understood that, if the document is too wide to be scanned in just two passes over the keyboard 908, the display panel 904 and/or camera 910 may be repositioned between the first and last sweeps so as to capture a sequence of images down the middle of the document.

It should further be understood that the foregoing process could be used with a desktop computer having a digital camera mounted to the display monitor.

As described herein, the present invention provides an efficient, low-cost method of scanning documents, especially documents containing text.

It should be understood that a digital still camera could be used in place of the video camera to generate the images used to create the electronic image of the document being scanned.

The foregoing description has been directed to specific embodiments of the present invention. It will be apparent, however, that other variations and modifications may be made to the described embodiments, with the attainment of some or all of their advantages. For example, the system may include a single motion estimation engine and a single alignment and blending engine. The system could also be used in Red, Blue Green (R,G,B) color environments. Therefore, it is the object of the appended claims to cover all such variations and modifications as come within the true spirit and scope of the invention.

What is claimed is:

1. A method for generating an electronic version of a document, the method comprising:
   receiving a plurality of digital, electronic images of the document;
   generating a corrected image from each received image;
   deriving one or more motion parameters for each pair of consecutive, corrected images, the motion parameters indicating the relative motion between the consecutive, corrected images, the motion parameters are derived by minimizing the sum of squares differences between each pair of consecutive images;
   aligning each image relative to the previous images based on the derived motion parameters; and
   blending each image into the previous images so as to produce the electronic version of the document;
   wherein the sum of squares differences is substantially given by the following equation:

$$E = \sum_{i,j} e^2(i, j)$$

wherein, $e(i, j) = I(i, j) - I'(i', j')$; and wherein $(i, j)$ and $(i', j')$ are corresponding pixel locations in a previous image and a current image, respectfully.

2. The method of claim 1 wherein the digital, electronic images are produced by a digital video camera.

3. The method of claim 1 wherein two or more series of digital, electronic images of the document are received, whereby each series of images corresponds to a respective sweep of the document by the video camera, the method further comprising:
   merging the images from each series together to form a composite, mosaic image of the respective sweeps; and
   merging consecutive mosaic sweep images together to form the electronic version of the document.

4. The method of claim 1 wherein:
   the corrected image frames include a plurality of pixels; and
   the sum of squares differences is applied on a pixel-by-pixel basis.

5. The method of claim 1 wherein the motion model has eight motion parameters, $m_0, m_1, m_2, m_3, m_4, m_5, m_6$ and $m_7$ defined by:

$$i' = (m_0 + m_2 i + m_3 j)/(m_6 i + m_7 j + 1); \text{ and}$$

$$j' = (m_1 + m_4 i + m_5 j)/(m_6 i + m_7 j + 1).$$

6. The method of claim 5 further comprising subsampling the received images, wherein:

$$m_2 = m_5 = 1; \text{ and}$$

$$m_3 = m_4 = m_6 = m_7 = 0.$$

7. The method of claim 6 wherein subsampling the received images comprises discarding one out of two pixels in both the horizontal and vertical directions from each received image.

8. The method of claim 5 wherein:

$$m_5 = m_2;$$

$$m_4 = m_3; \text{ and}$$

$$m_6 = m_7 = 0.$$

9. The method of claim 5 wherein:
   the received image frames have YUV color space components, wherein Y corresponds to luminance and U and V correspond to chrominance;
   the motion parameters are derived only for the Y component of the corrected images; and
   the derived motion parameters for the Y component are scaled for U and V components.

10. The method of claim 1 further comprising performing a spline-based registration on consecutive mosaic sweep images.

11. The method of claim 2 wherein the generating a corrected image comprises:
   building at least one look-up table having, for each pixel of the received image frames, a corresponding entry containing a correction factor; and
   applying the corresponding correction factors to the pixels of the received image frames to produce the corrected images.

12. The method of claim 7 wherein the correction factors stored at the at least one look-up table correct for off-axis illumination and radial lens distortion.

13. A method for generating an electronic version of a document, the method comprising:
receiving a plurality of digital, electronic images of the document, said electronic images being produced by a digital video camera;
generating a corrected image from each received image, said generating comprising building at least one look-up table having, for each pixel of the received image frames, a corresponding entry containing a correction factor; and
applying the corresponding correction factors to the pixels of the received image frames to produce the corrected images;
deriving one or more motion parameters for each pair of consecutive, corrected images, the motion parameters indicating the relative motion between the consecutive, corrected images;
aligning each image relative to the previous images based on the derived motion parameters; and
blending each image into the previous images so as to produce the electronic version of the document.

14. The method of claim 13 wherein two or more series of digital, electronic images of the document are received, whereby each series of images corresponds to a respective sweep of the document by the video camera, the method further comprising:
merging the images from each series together to form a composite, mosaic image of the respective sweeps; and
merging consecutive mosaic sweep images together to form the electronic version of the document.

15. The method of claim 14 wherein the step of deriving the one or more motion parameters comprises minimizing a sum of squares differences between each pair of consecutive images.

16. The method of claim 15 wherein the corrected image frames include a plurality of pixels, and the sum of squares differences is applied on a pixel-by-pixel basis.

17. The method of claim 16 wherein the sum of squares differences is substantially given by the following equation:

$$E = \sum_{i,j} e^2(i, j)$$

wherein, $e(i, j) = I(i, j) - I'(i', j')$; and wherein $(i, j)$ and $(i', j')$ are corresponding pixel locations in a previous image and a current image, respectfully.

18. The method of claim 17 wherein the motion model has eight motion parameters, $m_0, m_1, m_2, m_3, m_4, m_5, m_6$ and $m_7$ defined by:

$i' = (m_0 + m_2 i + m_3 j)/(m_6 i + m_7 j + 1)$; and $j' = (m_1 + m_4 i + m_5 j)/(m_6 i + m_7 j + 1)$.

19. The method of claim 17 further comprising subsampling the received images wherein $m_1$ and $m_5$ are equal to one and $m_3$, $m_4$, $m_6$, and $m_7$ are equal to zero.

20. The method of claim 19 wherein the step of subsampling the received images comprised the step of discarding one out of two pixels in both the horizontal and vertical directions from each received image.

21. The method of claim 20 wherein the correction factors stored at the at least one look-up table correct for off-axis illumination and radial lens distortion.

22. The method of claim 18 wherein:
$m_2$ equals $m_5$;
$m_3$ equals $-m_4$; and
$m_6$ and $m_7$ are equal to zero.

23. The method of claim 18 wherein:
the received image frames have YUV color space components, where Y corresponds to luminance and U and V correspond to chrominance;
the motion parameters and derived only for the Y component of the corrected images; and
the derived motion parameters for the Y component are scaled for U and V components.

24. The method of claim 17 further comprising performing a spline-based registration on consecutive mosaic sweep images.

* * * * *

UNITED STATES PATENT AND TRADEMARK OFFICE
CERTIFICATE OF CORRECTION

PATENT NO. : 7,046,401 B2
APPLICATION NO. : 09/872725
DATED : May 16, 2006
INVENTOR(S) : Frederic Dufaux et al.

It is certified that error appears in the above-identified patent and that said Letters Patent is hereby corrected as shown below:

On the face page, in field (56), under "U.S. Patent Documents", in column 1, line 1, above "6,075,905 A * 6/2000 Herman et al. ......... 382/284" insert -- 5,604,546 * 2/1997 Iwata ......... 348/699 --.

In column 13, line 11, after "engine" delete "is".

In column 18, line 16, in Claim 19, delete "claim 17" and insert -- claim 18 --, therefor.

Signed and Sealed this

Twenty-fourth Day of March, 2009

JOHN DOLL
*Acting Director of the United States Patent and Trademark Office*